United States Patent [19]

Joscher et al.

[11] 3,978,938
[45] Sept. 7, 1976

[54] COMBINED AIRFLOW WITH FRONT MOUNTED FUEL TANK

[75] Inventors: Alfred J. Joscher, Lombard; Theodore F. Boone, Tinley Park, both of Ill.

[73] Assignee: International Harvester Company, Chicago, Ill.

[22] Filed: June 5, 1975

[21] Appl. No.: 584,247

[52] U.S. Cl. ............................ 180/68 R; 180/69 R; 280/5 A
[51] Int. Cl.² .................... B60K 11/04; B60K 15/02
[58] Field of Search .............. 180/68 R, 68 P, 54 A, 180/54 D, 54 E, 69 R; 280/5 A

[56] References Cited
UNITED STATES PATENTS

| | | | |
|---|---|---|---|
| 2,162,526 | 6/1939 | Buick | 180/69 R X |
| 2,223,262 | 11/1940 | Merkle | 180/54 A X |
| 2,871,967 | 2/1959 | Du Shane | 180/68 R X |
| 3,897,847 | 8/1975 | Knutson | 180/68 R |

*Primary Examiner*—M. H. Wood, Jr.
*Assistant Examiner*—Milton L. Smith
*Attorney, Agent, or Firm*—Douglas W. Rudy; Floyd B. Harman

[57] ABSTRACT

An arrangement of components for a tractor vehicle wherein the vehicle fuel tank is located at the front of the vehicle. A heat exchanger is located between the fuel tank and the vehicle engine and is provided with air flow from intake areas around the perimeter of the fuel tank as well as from intake ducts located at the side of the vehicle. A flow improving fan shroud surrounds the flow inducing fan which directs air flow for cooling through a heat exchanger then past the vehicle engine to expel radiantly heated air from around the engine.

7 Claims, 5 Drawing Figures

U.S. Patent  Sept. 7, 1976  Sheet 1 of 2  3,978,938
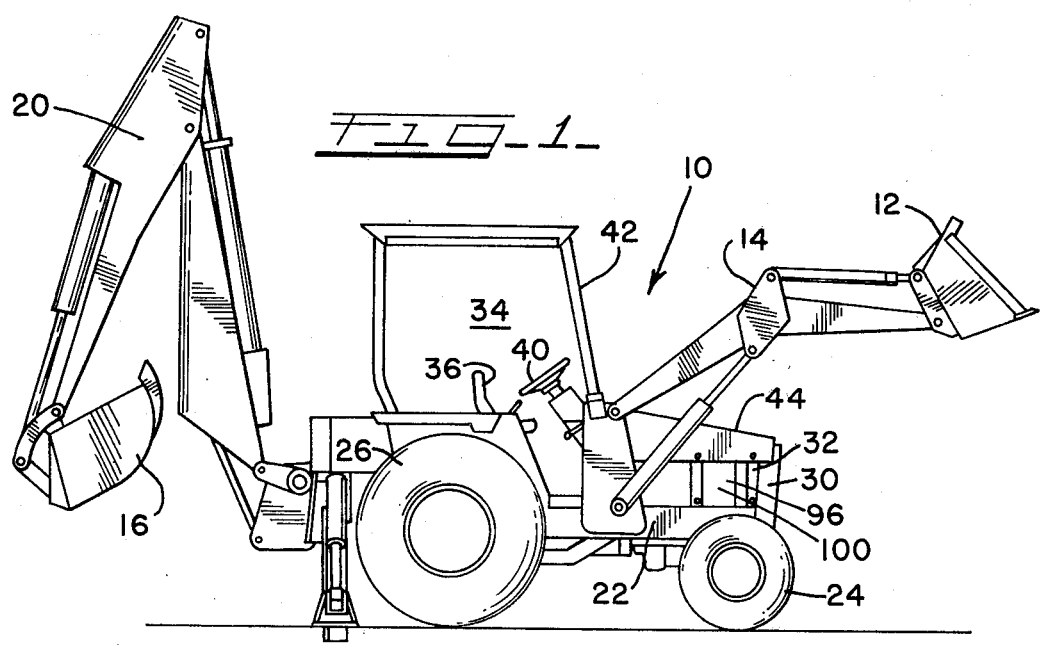
FIG_1_
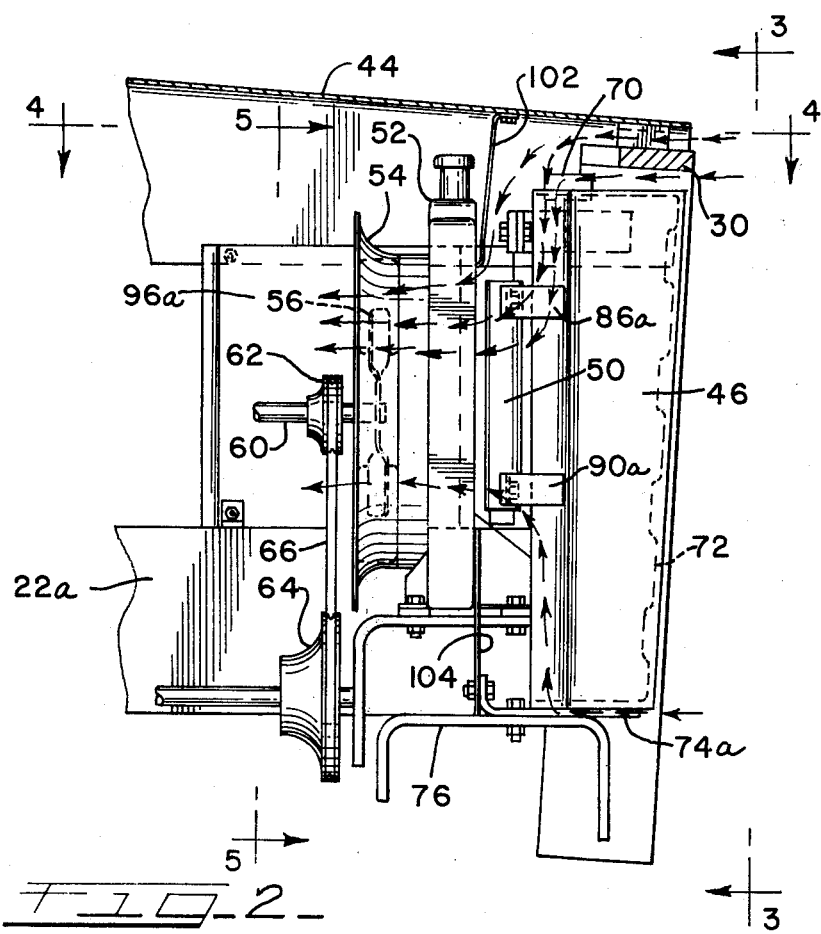
FIG_2_

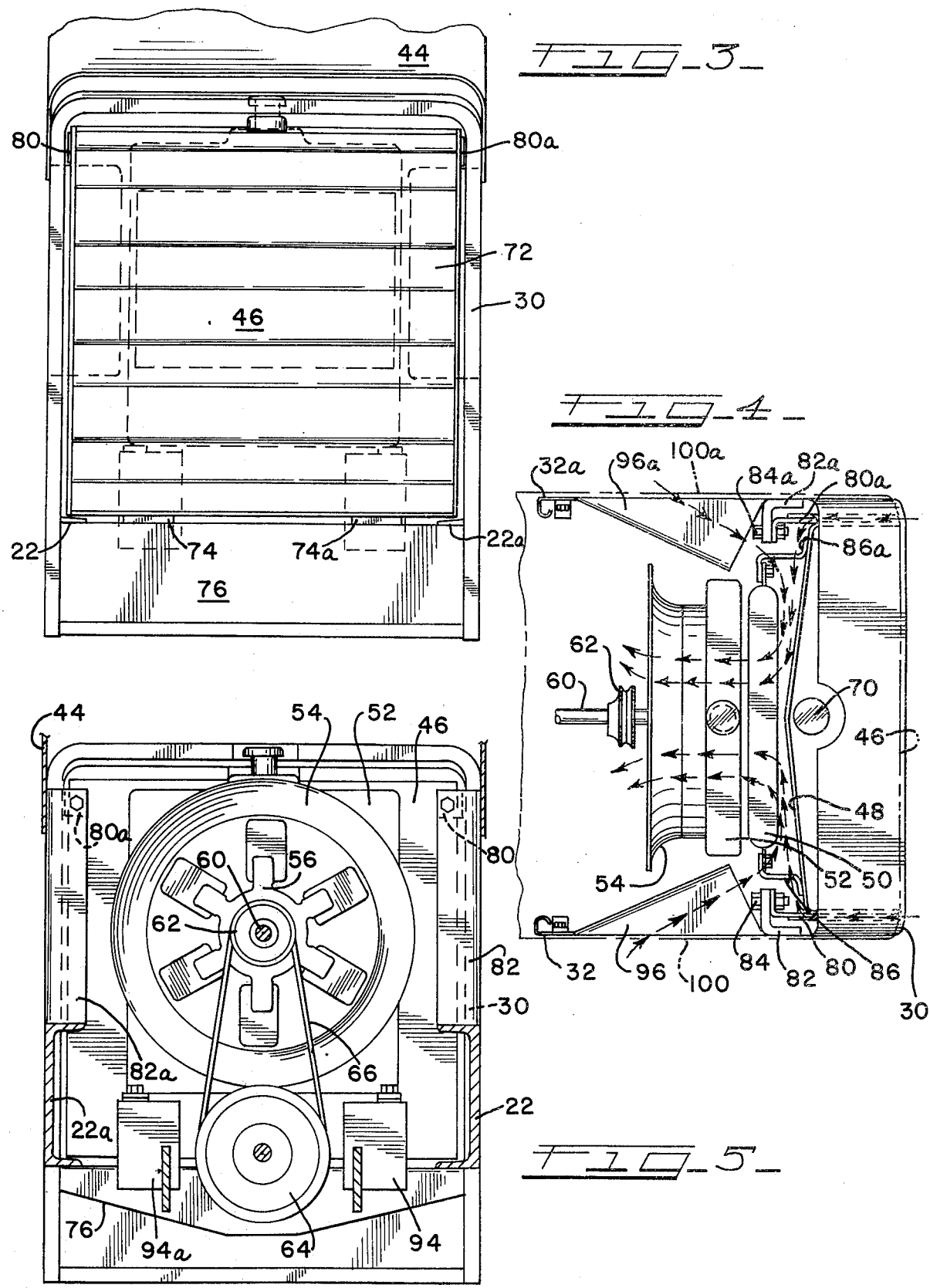

COMBINED AIRFLOW WITH FRONT MOUNTED FUEL TANK

BACKGROUND OF THE INVENTION

1. Field of the Invention

This invention relates to industrial tractor vehicles normally equipped with a front end loader and oftentimes also equipped with a backhoe. More specifically this invention deals with a fuel tank location for a vehicle of this type and the method of cooling the vehicle engine when the fuel tank is placed ahead of the vehicle radiator.

2. Description of the Prior Art

In the present state of the development of industrial tractors it is desirous to provide tractors that are compact yet reasonably well powered. As an industrial tractor must often be towed or trailered to a construction site it is advantageous to have the vehicle as compact as practical. Also when working at a construction site the maneuverability of the tractor is enhanced by its compactness. This compactness, however, should not necessitate the compromise in the power capabilities of the vehicle.

Therefore, the vehicle must be of a size that accommodates an engine and the necessary operating paraphernalia to ensure a good payload. One of the components of an industrial tractor that has heretofore not been mounted in priority positions is the vehicle fuel tank. A fuel tank is usually a relatively large vessel. Consequently it is not possible to fit the tank into any of the numerous voids around the tractor engine as can be done with smaller dimensioned items. Currently the fuel tank on industrial tractors of the type to which this invention is directed is usually outboard of the operator's work station ahead of the rear traction wheels and generally behind the engine. There are alternative fuel tank locations, such as behind the operator's work station between the rear wheels, or on top of the vehicle engine, however, these alternative locations have various drawbacks. For instance, a rear mounted tank may impede or restrict the design layout of a rear mounted backhoe on an industrial tractor while having the tank mounted over the engine may adversely effect the forward vision of the operator, induce unwanted fuel evaporation through the proximity of engine heat and possibly present a serious safety problem.

According to the present invention, an improved fuel tank location is disclosed wherein the fuel tank is located at the forward portion of the tractor frame in a location normally occupied by the radiator. The radiator, in this invention, is moved behind the fuel tank in a normal relationship with respect to the vehicle engine.

There are several advantages to this location which have been touched on previously. To reiterate, this location provides for a compact tractor, both visually and actually, as the "outrigger" saddle type fuel tanks can be eliminated. The fuel tank is mounted far away from exposure to engine heat which may cause fuel evaporation while at the same time presenting a significant safety hazard. The tank is no longer exposed to damage from below such as puncture by tree stumps, rocks, etc.

SUMMARY OF THE INVENTION

An arrangement of equipment integral with an industrial tractor having the fuel tank located immediately ahead of the radiator. The radiator, as well as the oil cooler, are located in a standard orientation behind the tank and ahead of the vehicle engine. Air flow is directed to the radiator by a system of baffles and intake ducts. Flow is maximized through the use of a flow improving fan shroud circumferentially disposed around the engine driven fan.

An object of this invention is to provide a location for a fuel tank that will be esthetically pleasing and will improve the appearance of an industrial tractor by making it look more compact.

A further object of the invention is to minimize the possibility of a safety hazard existing due to the proximity of the fuel tank to the vehicle engine. The fuel tank in this invention is remotely mounted with respect to the engine and is also segregated from the engine by the interposition of the radiator and oil cooler.

Another feature of the invention is that fuel evaporation is minimized as the fuel tank is, as stated above, remote from the engine as well as being shaded by an upright frame appendage and cooled by the flow of air around the periphery of the tank.

Also an object of the invention is to mount the fuel tank and the radiator in positions that are shielded from damage due to exposure to the environment in which the industrial tractor often operates.

These and other advantages and features inherent in the front mounted fuel tank location described herein will become apparent upon reading the following description of a preferred embodiment.

BASIC DESCRIPTION OF THE DRAWINGS

FIG. 1 is a side elevation view of an industrial tractor incorporating the invention;

FIG. 2 is a side elevation cutaway view showing the placement of the various components of the invention;

FIG. 3 is a front elevation view of the fuel tank and associated components of the invention taken through plane 3—3 of FIG. 2;

FIG. 4 is a top view as depicted by plane 4—4 of FIG. 2 showing the relationship between the components of the invention;

FIG. 5 is a view of the forward portion of a tractor as taken along plane 5—5 of FIG. 2.

DETAILED DESCRIPTION OF THE INVENTION

The invention disclosed herein is shown in the environment of an industrial tractor, generally 10, having a front mounted loader bucket 12 carried on a boom means 14 and a rear mounted backhoe having a scoop 16 carried on a boom means 20. The tractor vehicle is equipped with a main frame 22 supporting steerable ground-engaging wheels 24 (one shown) at the forward portion of the frame and traction wheels 26 (one shown) at the rear portion of the tractor 10. The main frame also supports a frame appendage 30, an engine which is hidden from view by the main frame 22 and side panels 32 and an operator's work zone 34 having a vehicle seat 36, a steering wheel 40, and a rollover protective structure 42 as well as other equipment indigenous to industrial tractors. The forward portion of the vehicle is covered by a hood panel 44.

Referring now to FIGS. 2, 3, 4, and 5 which are various projections of the invention housed in the forward portion of the vehicle.

The main frame 22 supports a frame appendage 30 which is in the form of an inverted U having one leg thereof attached to each rail (22 and 22a) of the main frame. The bight of the inverted U provides a mounting location for the front mounted fuel tank 46.

Progressing rearward from the front mounted fuel tank the figures show an oil cooler 50, a radiator or heat exchanger 52, a flow improving fan shroud 54 circumferentially disposed around the fan 56 which shares a common shaft 60 with the belt drive pulley 62. The fan 56 is driven by a second pulley 64 driven by the vehicle engine (not shown) through belt 66.

The engine at the forward portion of the vehicle is enclosed by the side panels 32 and 32a and the hood 44.

The fuel tank 46 is generally rectangular as shown in FIG. 3. FIGS. 2, 4, and 5 show that the tank 46 is also equipped with several other features. A filler neck and cap 70 is provided at the top portion of the tank to allow for the passage of fuel into the tank. The front surface of the tank 46 is equipped with horizontal ribs such as 72, which add strength to the surface as well as provide a pleasing appearance. The sides of the tank are flat walls which are gently tapered from the top of the tank to the bottom of the tank such that the distance between the front and back wall surfaces of the tank 46 is greater at the top of the tank than at the bottom. The rear wall 48 of the fuel tank 46 is constructed of two planes having different angular relationships with the sides of the tank which intersect at the vertical center of the tank. The respective planes get further away from the front surface of the tank as they project from the rear corners of the tank to their intersection point at the vertical or longitudinal center of the rear of the tank. The tank is mounted to the vehicle frame through the use of two lower mounting tabs or members 74, 74a which are fixed to (as by bolting) a main frame cross member 76 which connects the main frame members 22 and 22a and also transverses the legs of the inverted U of the frame appendage 30. Two upper mounting tabs or members 80 and 80a are used to mount the upper portion of the tank 46 to a pair of upwardly extending posts 82 and 82a which project upwardly perpendicularly on the respective main frame members 22 and 22a. These tabs 80 and 80a would normally be fastened to the posts 82 and 82a with fasteners, for example the bolts and nut assemblies shown as 84 and 84a.

A provision for allowing fuel to pass from the tank to the engine is also provided as is a tank drain provision (neither of which is shown in the drawings).

The oil cooler 50 is held in position in front of the radiator 52 through the means of upper, 86 and 86a, and lower, 90 and 90a, mounting tabs which are affixed to the rear wall of the fuel tank 46 and to the oil cooler body 50. The oil cooler is of conventional construction, having inlet and outlet orifices connected to the traditional fluid conduit (not shown) leading to and from a hydraulic oil reservoir, and is somewhat smaller than the radiator 52.

The radiator 52 is equipped with a filler neck and a cap 92 and is relatively conventional in construction having inlet and outlet orifices connected to the traditional radiator supply conduits such as those running to the engine block. The radiator is carried on and mounted to pedestals 94 and 94a.

A drain means is provided but not shown in the drawings.

A door (not shown) is provided in the hood 44 to allow access to the radiator and fuel tank filler necks.

A significant component of the heat transferring equipment is the fan shroud 54. The fan shroud assists the fan in providing adequate air flow to the radiator. The fan shroud is of the type producing a so-called Coanda effect. This type of fan shroud improves air flow through the radiator and contributes significantly to the effectiveness of the invention herein disclosed.

The fan shroud 54 is mounted to the engine side of the radiator 52 and closely encompasses the fan 56. The fan is a conventional fan driven by means of the fan belt 66 from a crank shaft mounted pulley 64. The fan turns in conjunction with the engine which is not shown in detail.

Other equipment which makes the forward mounting location of the fuel tank possible is the series of baffles and ducts which direct incoming air to the oil cooler 50 and the radiator 52. Two side ducts 96 and 96a (shown best in FIG. 4) are carried by the side panels 32 and 32a. These ducts are basically rectangular in an elevation view and have an inclined inner surface propagated from the rear juncture thereof to the forward juncture thereof which is the point of maximum duct depth. The openings in the side panels which are the intake openings to the ducts 96 and 96a are covered with perforated screens 100 and 100a which prohibit the passage of air borne refuse from entering the duct and becoming trapped on the inlet surfaces of the oil cooler and the radiator.

As shown by FIG. 2 air flow can be drawn in above the frame appendage 30, below the hood 44, between the frame appendage and the upper surface of the fuel tank 46 and, below the lower surface of the fuel tank above the main frame cross member 76. In order to get optimum effect from this incoming air an upper baffle 102 and a lower baffle 104 are positioned to channel the incoming air to the oil cooler and the radiator.

Air may also be drawn in by means of the fan around the sides of the fuel tank inside the frame appendage 30. The baffles previously mentioned may also contribute to directing this air. Further air flow control is provided by the inclined rear surfaces of the fuel tank.

Air that has been drawn through the heat exchangers is blown over the engine by the fan. This assists engine cooling by forcing heated air away from the vicinity of the engine block. This air is generally directed rearwardly and downwardly until it finds its way out of the enclosed engine compartment.

The operation of the system of cooling is contingent upon the fan drawing fresh air from around the fuel tank and from the side mounted ducts and directing this air, by means of baffles, through the oil cooler and the radiator (or any single or combination of heat exchangers).

Thus, it is apparent that there has been provided, in accordance with the invention, a provision for a combined air flow to heat exchangers which allows the front mounting of a fuel tank in an industrial tractor which also fully satisfies the objects, aims and advantages set forth above. Although the invention has been described in conjunction with a specific embodiment thereof, it is evident that many alternatives, modifications, and variations will be apparent to those skilled in the art in light of the foregoing discription. For example, the invention might be equally utilized on other types of tractor vehicles such as farm tractors or similar equipment. Accordingly, it is intended to embrace all such alternatives, modifications and variations that fall within the spirit and broad scope of the appended claims.

What is claimed is:

1. In a tractor vehicle having a pair of longitudinally disposed main frame members which support an engine at a forward portion of the tractor, a fuel tank mounted upright in said forward portion of said tractor, a radiator for cooling said engine mounted between said fuel tank and said engine, an oil cooler mounted to said fuel tank between said tank and said radiator and a system of baffles to direct a flow of air through said radiator and said oil cooler, the improvement comprising:
- a vertically disposed main frame appendage having parallel sides permanently affixed to each of said frame members and a cross piece connecting the upper extremities of each of said parallel sides of said frame appendage;
- a hood component on the upper portion of said forward portion of said tractor covering said vehicle engine, said fuel tank, said radiator, and said oil cooler and further covering and fixedly attached to said main frame appendage;
- a pair of side walls positioned between said main frame and said hood component;
- said side walls being equipped with air flow directing ducts for allowing air flow to said radiator.

2. The improvement disclosed in claim 1 wherein said frame appendage is in the shape of a rectilinear structure having the base portion and the top portion shorter than the side member portions and further is larger than the fuel tank such that the fuel tank can be located within the interior confines of said frame appendage.

3. The invention disclosed in claim 1 wherein said fuel tank is mounted vertically upright between and spaced away from the parallel sides and below the cross piece connecting the upper extremeties of each parallel side of said main frame appendage at the forward portion of the vehicle.

4. In an industrial tractor having an engine mounted in a forward portion thereof, a fuel tank mounted upright in said forward portion, a radiator mounted between said fuel tank and said engine in said forward portion of said tractor wherein said fuel tank is generally rectilinear having parallel side walls perpendicular to parallel top and bottom surfaces encompassing a ribbed front surface and a dual planar intersecting surface forming a back wall of said tank fabricated together to form a leak proof chamber for containing fuel; said fuel tank further being equipped with a capped filler neck for allowing filling with fuel, a drain aperture for allowing the draining of fuel from said tank, and a plurality of mounting tabs on the side walls thereof for mounting said tank in position at said forward portion of said tractor.

5. The invention defined in claim 4 wherein said dual planar intersecting surfaces forming the back wall of said tank project from said side walls of said tank to intersect at the point equally spaced from each of said side walls.

6. In a vehicle having a pair of longitudinally disposed main frame members connected by a main frame cross member supporting an engine, an upright, rectilinear fuel tank carried at the forward portion of the frame further being surrounded by a vertically disposed main frame appendage affixed to the forward portion of the frame, a radiator mounted between the fuel tank and the engine, a hood overlying the engine, the radiator, the fuel tank and the frame appendage, a fan for inducing flow through the radiator, and an air flow directing means for diverting the flow through the radiator the air flow directing means comprising:
- a pair of side intake ducts located between the main frame and the hood at the forward portion of the vehicle, further the ducts having an inclined inner surface propogated. from the rear juncture of each duct to the forward juncture of the duct which is the point of maximum duct depth;
- an upper baffle positioned between the hood and the top portion of the radiator the entire width of the front portion of the vehicle;
- a lower baffle, the width of the forward portion of the frame extending from a first longitudinal siderail to a second longitudinal siderail fixed to the uppermost surface of the main frame cross member and the lower portion of the radiator whereby the fan will draw air flow through the radiator as directed by the side ducts and the upper and lower baffles such that air will be drawn from forward of the periphery of the fuel tank and also through the side ducts to the radiator.

7. The invention as described in claim 6 wherein said side intake ducts are equipped with covering screens in the path of air flow through the ducts and further provide the discharge of air flow through them to be forward of the leading face of the radiator.

* * * * *